United States Patent [19]
Becnel

[11] Patent Number: 6,099,136
[45] Date of Patent: *Aug. 8, 2000

[54] ADVANCED HELICOPTER EMERGENCY ESCAPE LIGHTING SYSTEM

[75] Inventor: Steven A. Becnel, Belle Chasse, La.

[73] Assignee: Stratus Systems, Inc., New Orleans, La.

[ * ] Notice: This patent is subject to a terminal disclaimer.

[21] Appl. No.: 08/808,350

[22] Filed: Feb. 28, 1997

[51] Int. Cl.[7] ...................................................... F21K 2/06
[52] U.S. Cl. ........................... 362/34; 362/470; 362/501; 362/542; 362/276; 206/221
[58] Field of Search ................... 362/34, 61, 80, 362/276, 802, 501, 540, 542, 470, 477; 340/971, 984; 206/219, 221; 116/206

[56] References Cited

U.S. PATENT DOCUMENTS

| | | | |
|---|---|---|---|
| 4,791,149 | 12/1988 | Pocknell | 208/221 |
| 4,902,287 | 2/1990 | Carmen et al. | 206/221 |
| 5,508,893 | 4/1996 | Nowak et al. | 362/34 |
| 5,581,230 | 12/1996 | Barrett | 362/501 |

*Primary Examiner*—Alan Cariaso
*Attorney, Agent, or Firm*—Banner & Witcoff Ltd.

[57] ABSTRACT

A chemically activated lighting system is provided which serves to clearly mark an exit door or hatch as an emergency escape route. The system utilizes two chemical agents which when mixed together form a compound which radiates light. The agents are stored in a container which defines separate chambers for each agent. When the system is activated, the volume of each chamber is reduced, thereby forcing each agent into a mixing chamber where they are combined. The compound is then passed through a transparent conduit which is formed around the escape exit.

5 Claims, 10 Drawing Sheets

FIG.1

SECTION A-A
FIG.2

ADVANCED HELICOPTER EMERGENCY ESCAPE LIGHTING SYSTEM

BACKGROUND OF THE INVENTION

The present invention generally relates to the field of emergency safety systems, and more particularly, is directed to an emergency lighting system which marks and identifies escape routes and passageways during an emergency condition in buildings, vehicles, aircraft, and watercraft.

In many emergency situations, such as fires, earthquakes and the like, occupants of a building must vacate the premises very quickly. In such situations, which usually are accompanied by confusion and chaos, the occupants may not be readily aware of emergency routes of escape. Moreover, in periods of darkness, escape routes may not be visual.

While fire safety codes require the posting of exit signs in buildings and government regulations require the similar posting of signs in common carriers, such as aircraft, trains and buses, these signs are not always adequate during an emergency situation. A major disadvantage is that such signs are usually posted many feet from the actual escape point. Thus, in darkness, the signs may be of no real use to someone trying to escape from a building The problem of inadequate marking of escape routes is even more severe in aircraft. For example, there is often only limited time for occupants to respond to an emergency condition in an aircraft. In addition, the occupants are usually preoccupied with overcoming the emergency, or mitigating its effects, until the craft has been stabilized or come to rest. Only then do the occupants have an opportunity, or the presence of mind, to focus on an escape route. The ability to locate an escape route quickly and exit the aircraft will often mean the difference between a successful or failed escape. Thus, an effective method for locating emergency escape routes is particularly important for aircraft.

Accordingly, there is a great need for an effective emergency lighting system which marks and identifies escape routes and passageways during an emergency condition.

SUMMARY OF THE INVENTION

Accordingly, it is an object of the present invention to obviate the above-noted shortcomings and disadvantages of emergency escape routes and marking systems known in the prior art.

It is a further object of the present invention to provide an emergency escape marking system which can be automatically operated without user intervention It is a still further object of the present invention to provide an emergency escape marking system which clearly outlines the boundaries of the escape route.

It is a still further object of the present invention to provide an emergency escape route marking system which is visible in low light conditions.

It is a further object of the present invention to provide an emergency escape route marking system which is self-contained and not be reliant on outside systems for its operation.

It is a still further object of the present invention to provide an emergency escape route marking system which can be activated remotely in the event of an emergency condition.

It is also an object of the present invention to provide an emergency escape route marking system which is low in cost to manufacture and can be readily installed adjacent existing emergency escape routes.

These and other objects of the present invention are achieved by a novel emergency lighting system which marks and identifies escape routes and passageways during an emergency situation which allows for much quicker escape.

In accordance with the present invention, a chemically activated lighting system is provided which serves to clearly mark an exit door or hatch as an emergency escape route. The system utilizes two chemical agents which when mixed together form a compound which radiates light. The compound is then passed through a transparent conduit which is found around the escape exit.

Illumination of the conduit by the chemical compound serves as a positive and clear way of marking the exit so that it can be readily located in times of emergency.

Each of the chemical agents which are mixed to form the chemical compound are stored in separate collapsible chambers. When the system is activated, compressed gas is released from a $CO^2$ canister which causes the chambers which contain the chemical agents to be compressed, forcing the agents out of their respective chambers and into a central mixing chamber where they are mixed and form the light producing compound. The compound is then passed through the transparent conduit in order to illuminate the escape exit.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

A preferred embodiment of the present invention will now be described with reference to the accompanying drawing.

Figure 1:
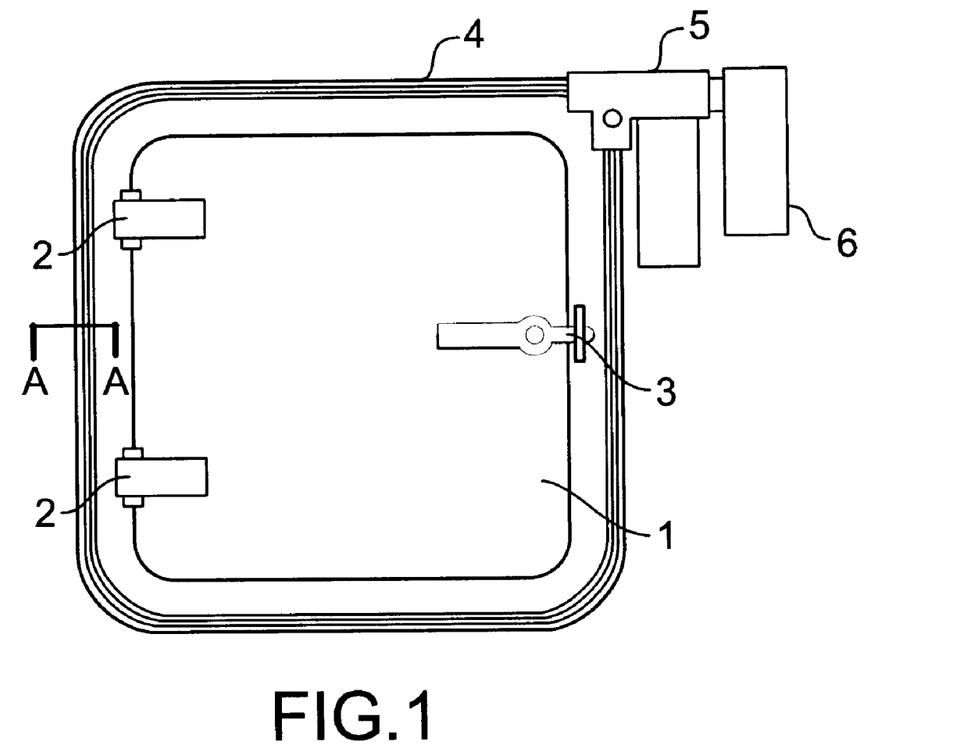
FIG. 1 is an assembly view of the emergency escape lighting system in accordance with applicant's invention.

FIG. 1 illustrates a hatch, or exit door 1 around which the emergency escape lighting system of the present invention is installed. Hatch 1 includes a pair of hinges 2 and a latch assembly 3. Hatch 1 and its associated hinges 2 and latch assembly 3 are conventional assemblies and are well known in the art.

The lighting system of the present invention can be broken into three subassemblies; a tube and rail assembly 4, a chemical light storage and mixing assembly 5 and a system activation assembly 6.

Figure 2:
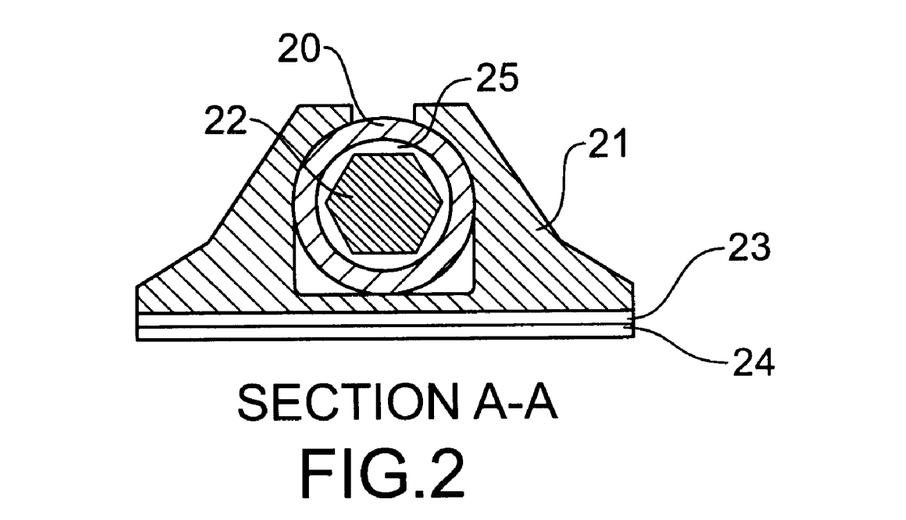
FIG. 2 is a cross-sectional view of the emergency escape lighting system of applicant's invention take along line A—A in FIG. 1.

A cross section of tube and rail subassembly 4 is illustrated in FIG. 2. The assembly is formed of a clear plastic polyurethane tube 20 which is held in place by a clear extruded polyurethane track 21. Tube 20 has a core 22 in its center which serves two purposes: 1) it reduces the volume of chemical light required to fill the tube, and 2) it adds strength to the tube so that it does not collapse if exterior pressure is applied. As shown in FIG. 2, a cavity 25 is formed between core 22 and the inside surface of tube 20. As discussed in further detail below, a chemical light material passes through cavity 25 when the system is activated.

Rail 21 has a reflective backing 23 with a self adhesive strip 24 to assist in light radiation and installation. Backing 23 also provides support to tube 20 as it does not kink.

Figure 3:
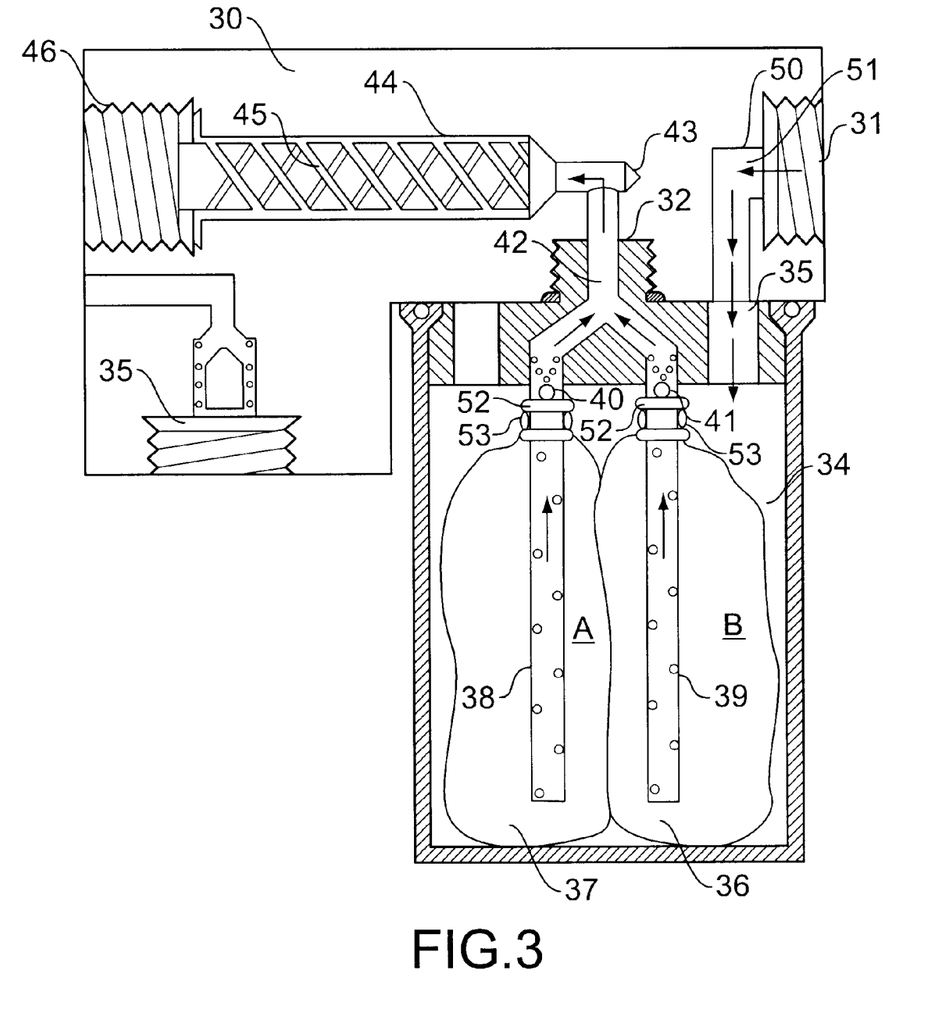
FIG. 3 is an assembly and cross-sectional view of the chemical storage and mixing assembly which forms a part of the emergency escape lighting system in accordance with applicant's invention.

Chemical storage and mixing assembly 5 is illustrated in further detail in FIG. 3. The assembly is formed of a manifold 30 which includes air inlet port 31, chemical inlet port 32 and air return inlet port 33.

Figure 4:
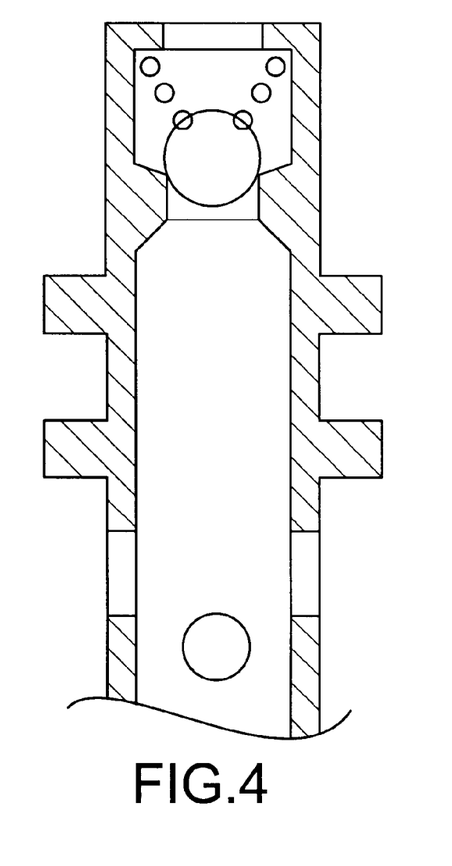
FIG. 4 is a cross-sectional view of the perforated tube and check valves shown in FIG. 3.
Figure 5:
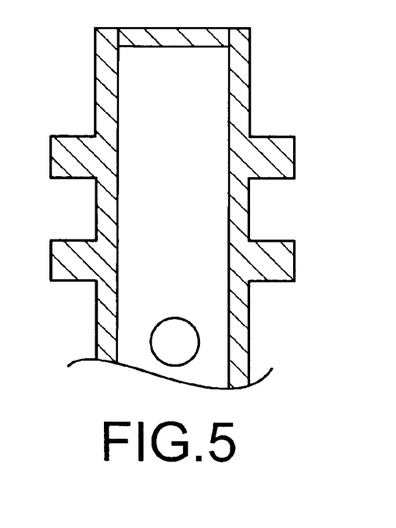
FIG. 5 is a cross-sectional view of another embodiment of the perforated tube shown in FIG. 4.

When air pressure from activation assembly 6, discussed below, enters air inlet port 31, it moves along a passage way 50 to chemical storage chamber 34 through port 35 as shown by arrows 51. Chamber 34 includes compressurable chemical component bags 36 and 37. Bags 36 and 37 contain chemical agents which when mixed together form a compound which radiates light as is known in the art. As pressure increases in chamber 34 due to the incoming air flow from activation system 6, it will apply pressure to chemical bags 36 and 37. This will force the chemicals up respective perforated tubes 38 and 39 through check valves 40 and 41 and into chemical inlet port 33. FIGS. 4 and 5 illustrate alternative embodiments for perforated tubes 38 and 39.

Mixing inlet port 43 diverts the chemicals into a spiral mixing chamber 44 where they will then be diverted to port 46 and injected into tube and rail system 4 as illustrated in FIG. 1.

On a closed loop system the end 47 of inlet 33 and the vent valve at the tube return inlet port will allow the air in the line to be released to the atmosphere. Due to the difference in fluid resistance of the air in the line verses the chemical, when the chemical reaches the valve it will close.

The emergency escape lighting system is designed to activate when pressure is applied to the storage and mixing manifold. The emergency activation system is designed to deliver activation pressure from a $CO_2$ cartridge.

Figure 6:
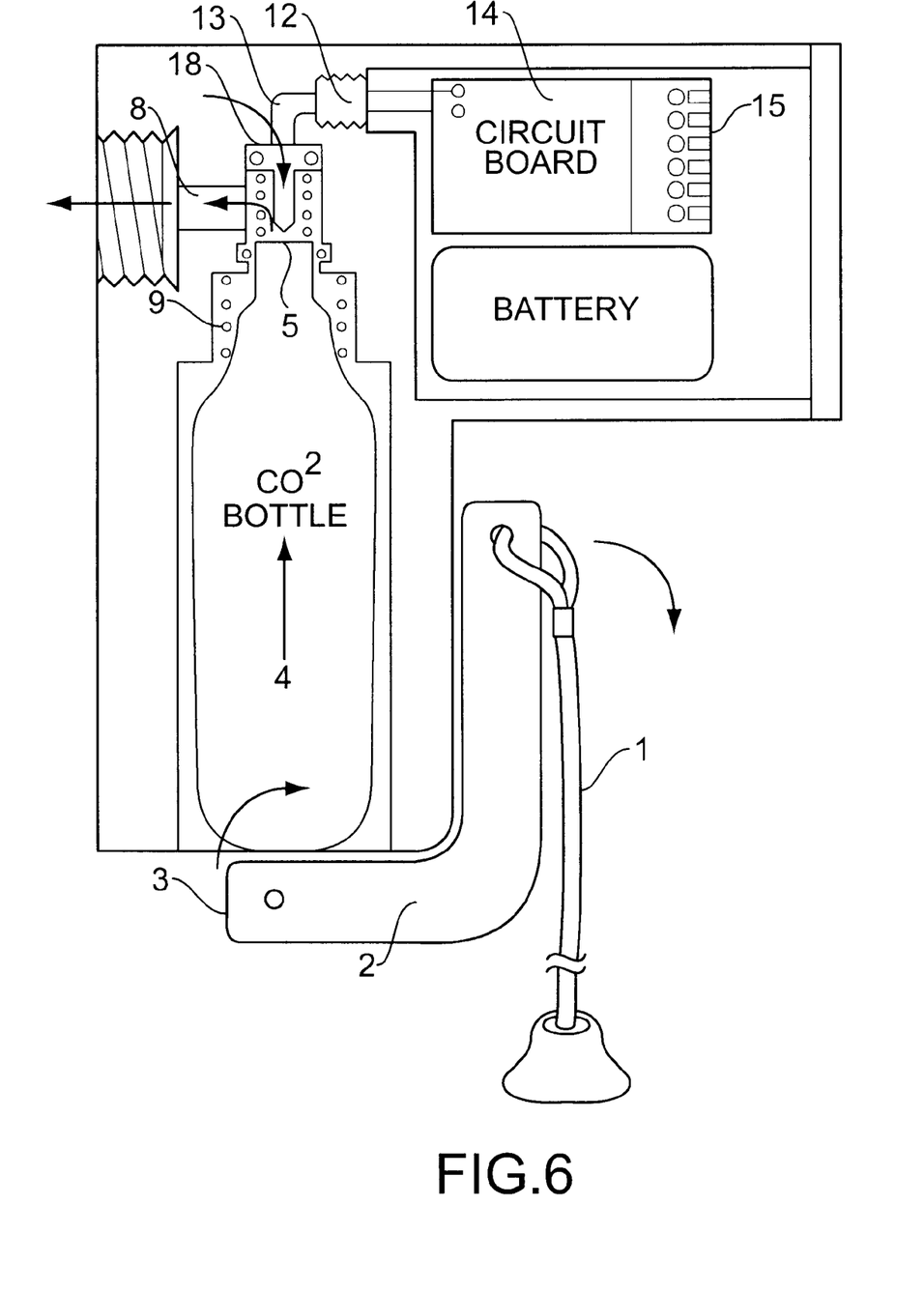
FIG. 6 is an assembly and cross-sectional view of the system actuation assembly which forms a part of the emergency escape lighting system in accordance with Applicant's invention.

The activation system will now be described with reference to FIG. 6. In the manually activated mode when lanyard 61 is pulled in the down position it rotates lever 62 clockwise. Lobe 63 exerts a force in the direction of arrow 64 on the $CO_2$ bottle 65. As the top of the bottle 5 presses against puncture pin 66, puncture pin 66 pierces seal 67 on the bottle and releases the gas through port 68 and into the manifold.

Piercing pin 66 is held in place against ridge 71 by spring 70. $CO_2$ bottle 65 is held away from pin 66 by spring 69 and rests on handle 60.

The system can also be activated by applying an electrical pulse to gas pressure cartridge 72 which will create pressure in port 73 behind puncture pin 66. This pressure will drive puncture pin 66 into the $CO_2$ bottle seal 67 and release the $CO_2$ into port 68 into the manifold.

Figure 7:
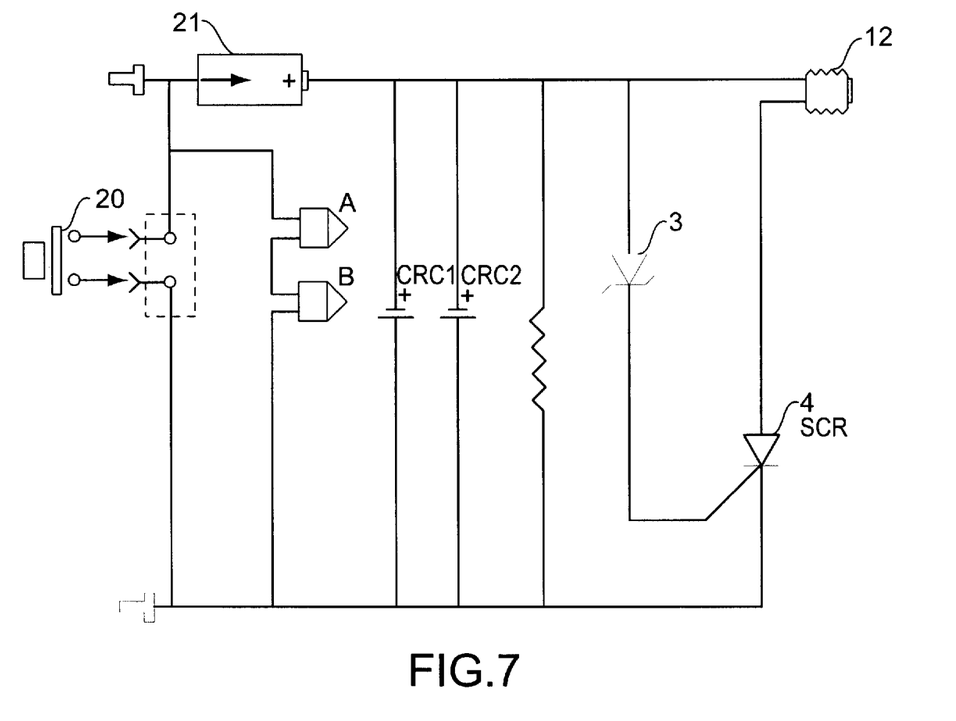
FIG. 7 is a schematic diagram of the electronic activation circuitry for the emergency escape lighting system in accordance with Applicant's invention.

The pulse to the gas generator 72 can be delivered by circuit card 74 or from an external source through terminal strip 75. FIG. 7 is a schematic diagram of circuit card 74. Circuit card 74 has sensors on board to fire the system if it is submerged in sea water or if it inverts as when the system is installed on a vehicle and the vehicle rolls over. Circuit card 74 also has provisions for external sensors through terminal 75 for fire, smoke, vibration and remote firing of the unit.

When the device is submerged in seawater having a conductivity of 100 u mho's or higher and the seawater bridges the gap between immersion probes A & B, capacitors 85 & 86 begin to charge. When the voltage level of the capacitors reaches a level set by the zener diode 83 a current is applied to the gate terminal of the SCR 84. This allows the voltage in the capacitors to dump through gas generator 72 and thereby supply enough current to fire and generate gas to drive the piercing pin 66 into the seal of $CO_2$ bottle 65.

A push button normally open switch 80 also is provided to manually trigger the circuit. As illustrated in FIG. 7, switch 80 is connected in parallel with probes A and B, thus bypassing the probes and delivering current to capacitor 85 and 86, diodes 83 and SCR 84 as described above. A mercury tilt switch may also be connected in parallel with probes A and B to automatically trigger the system when a tilt condition is detected.

The circuitry is powered by a battery 81.

Figure 8A:
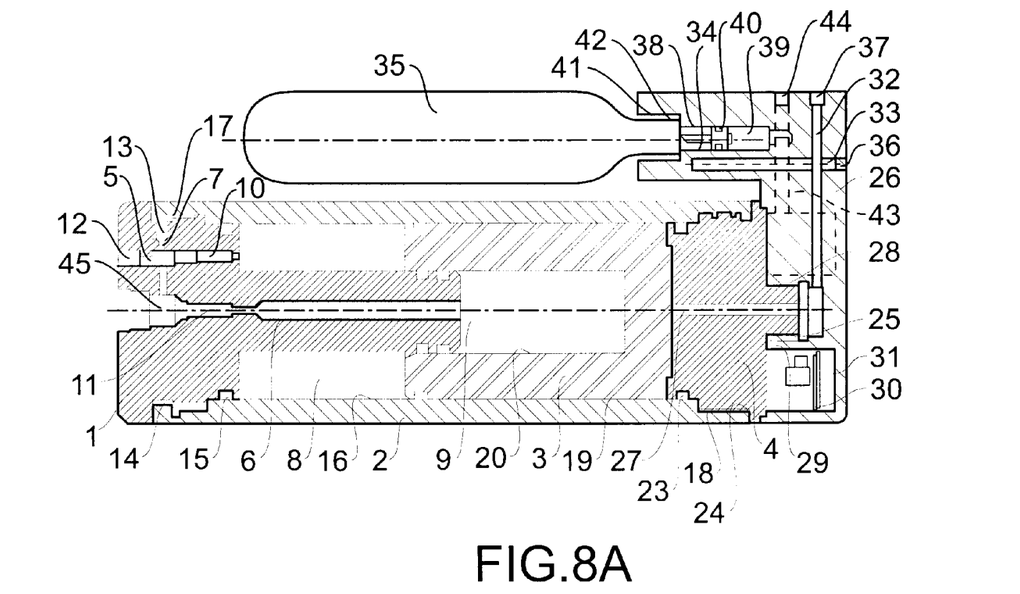
FIGS. 8A and 8B are cross-sectional views of an alternative embodiment for mixing the chemical light material for the emergency escape lighting system of Applicant's invention.
Figure 8B:
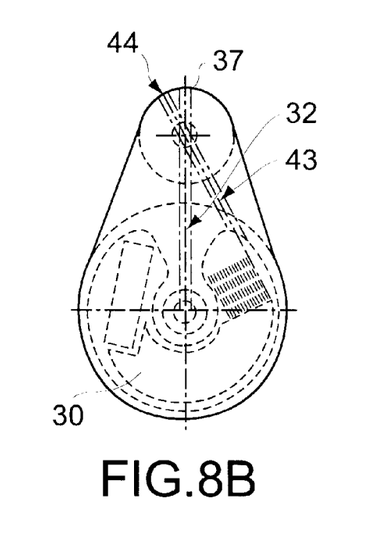

FIGS. 8A and 8B illustrates an alternative method of delivering, mixing and injecting the two chemical light components into the light display tube. The alternative method consists of cartridge end cap 101, cartridge cylinder 102, cartridge piston 103, cartridge end cap 104, and electronics housing 126.

Cartridge end cap 101 includes two parallel bores 105 & 106 and perpendicular bore 107 which form a connecting path for chemical chambers 108 & 109. Bore 105 houses check valve 110 and bore 106 houses check valve 111. Bore 105 is plugged at its end by bore plug 112. Bore 106 has a ¼" NPT thread machined into its opening to facilitate connection to tube and rail assembly 104. Perpendicular bore 107 is plugged by bore plug 113. End cap 101 also has a male threaded portion 114 to facilitate connection to cartridge cylinder 102. O-ring 115 forms a pressure seal between end cap 101 and cartridge cylinder 102.

The cartridge cylinder is formed of bore 116 which forms the outer wall of fluid chamber 108 and the guide wall for piston 103. The cartridge cylinder also is formed of female threaded portions 17 & 18 for connecting to cartridge end cap 101 and cartridge end cap 104.

Cartridge piston 103 is formed of outer diameter 119 which guides the piston in bore 116 of cartridge bore 102 and bore 120 which forms chemical chamber 109. Chemical chambers 108 & 109 are isolated from each other by O-rings 121 & 122.

Cartridge end cap 104 includes o-ring 123 which forms a pressure seal between cartridge cylinder 102 and end cap 104. End cap 104 also has male threaded portion 124 to facilitate connection to cartridge cylinder 102. Cartridge end cap 104 also consists of male threaded portion 125 which facilitates connecting end cap 104 to electronics housing 126. Bore 127 is formed to transfer gas pressure through end cap 104 to the head of piston 103.

Electronics housing 126 includes female threaded portion 128 which facilitates connecting end cap 104 and electronics housing 126, and o-ring 129 which forms a pressure seal between items 104 & 126. Housing 126 also consists of detection circuit board 130 which is recessed and encapsulated into pocket 31. Intersecting bores 132, 133 and 134 are formed to transfer gas pressure from gas cylinder 135 when the system is activated. Bores 132 & 133 are plugged by bore plugs 136 and 137. Bore 138 is formed to receive dimple motor 139 and gas cylinder puncture pin 140. Bore 138 also contains threaded portion 141 which facilitates connection to gas cylinder 135. O-ring 142 forms a pressure seal between housing 126 and gas cylinder 135. Bore 143 is formed to create a passage for electrical connection between dimple motor 139 and detection circuit board 130. Bore 143 is end plugged by plug 144.

When the circuitry on detection circuit board 130 detects a parameter in which it is set to fire the system, circuit board 130 sends a high energy pulse to dimple motor 139. Upon activation, dimple motor 139 extends and drives gas cylinder puncture pin 140 forward which pierces the seal on the gas pressure bottle. Gas pressure is released into bore 134 and is transmitted to bore 133. Bore 133 transmits the gas pressure to bore 132 which in turn transmits the pressure to the rear of cartridge piston 103 by way of end cap bore 127. As the gas pressure at the rear of cartridge piston 103 increases, the piston begins to move down bore 116 of the cartridge cylinder 102. As the piston moves forward, pressure is exerted on the two light creating chemicals in chambers 108 & 109 increase. When the fluid pressure increases to a point greater than the sealing pressure of check valves 110 & 111, the chemicals begin to move to the intersection of bores 105 & 106 which is located in area 145 at the base of the ¼" NPT threads. At area 145 the chemicals are metered together and properly mixed, and at this instance begin to produce light. The mixed chemical are then driven down tube and rail assembly 104 (See FIG. 1) through the connection made at the ¼" NPT connection formed in bore 106.

Figure 9:
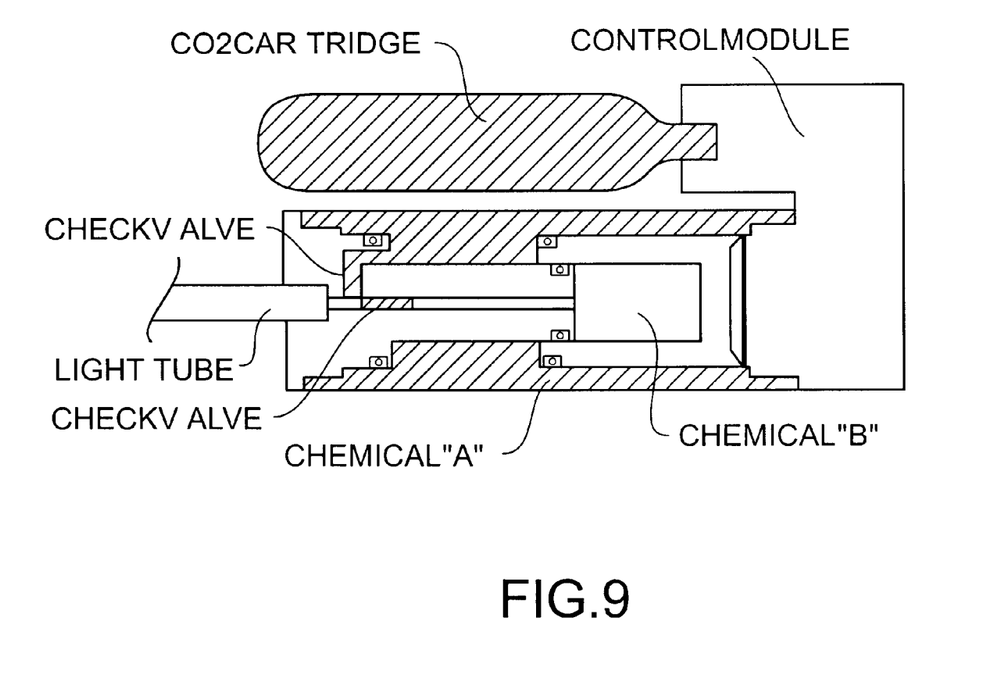
FIG. 9 illustrates the embodiment shown in FIGS. 8A and 8B before activation.
Figure 10:
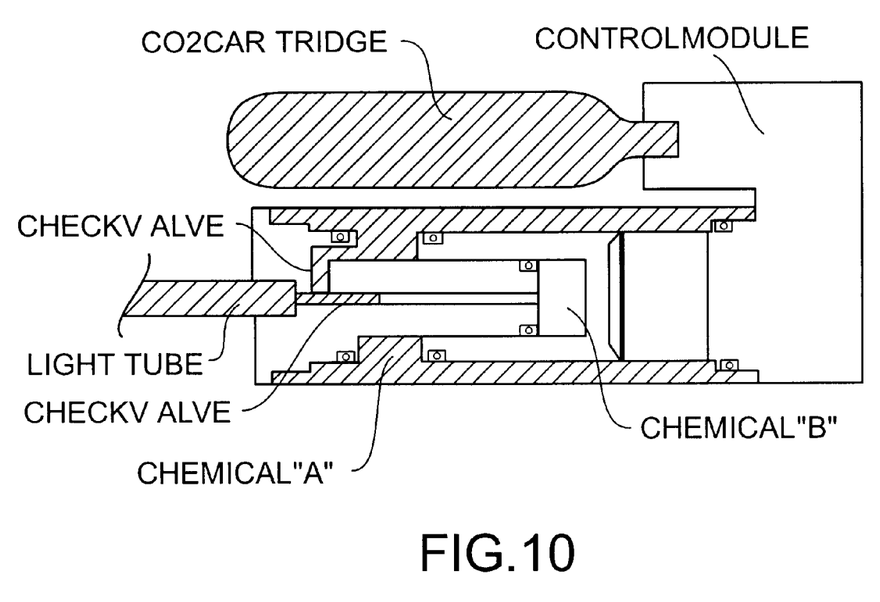
FIG. 10 illustrates the embodiment shown in FIGS. 8A and 8B during activation.
Figure 11:
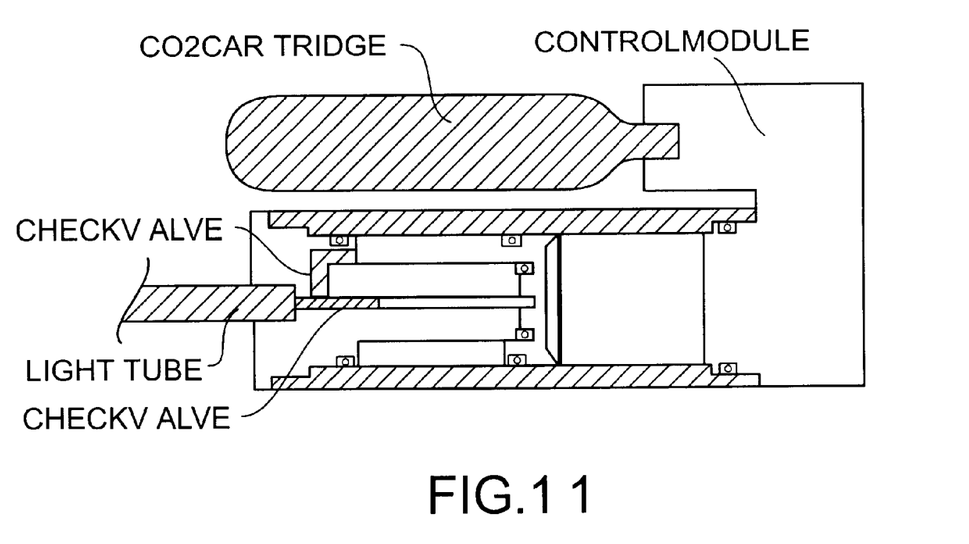
FIG. 11 illustrates the embodiment shown in FIGS. 8A and 8B after activation.

FIG. 9 illustrates the system configuration before activation. FIG. 10 illustrates the system during activation and FIG. 11 illustrates the system after activation.

Figure 12:
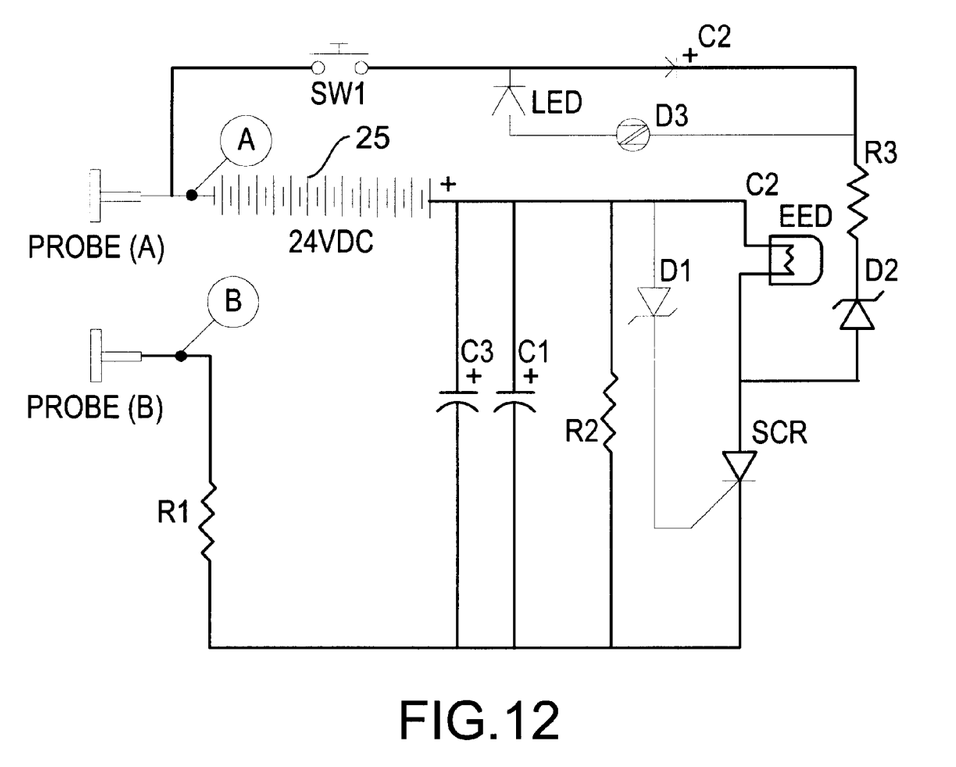
FIG. 12 is a schematic diagram of an alternative embodiment of the electronic activation circuitry for the emergency escape lighting system in accordance with Applicant's invention.

FIG. 12 illustrates an alternative embodiment of the detection circuitry. In the circuit of this embodiment, probes A and B are connected to a battery 175 and operates essentially the same way as the detection circuitry shown in FIG. 7 with respect to its detection function. The embodiment in FIG. 12, however, includes a test feature.

The test feature performs a battery voltage test and also test that the bridge wire of the electrically explosive device ("EED") is intact. When switch SW1 is pressed, it completes the circuit through the EED bridge wire. Diode D2 reduces the voltage from the battery to the set level needed to activate the silicon bidirectional switch D3. Resistor R3 supplies a load and charges capacitor C2 to the specific voltage level to activate D3. When capacitor C2 is charged to the switch voltage of D3, D3 opens and discharges capacitor C2 through the LED. If the voltage of the battery is not at a specified level set by diode D2 the Led will not flash. If the bridge wire of the EED is not intact the LED also will not flash.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A system for illuminating the perimeter of an opening, said system comprising:

a light enclosure which can be positioned adjacent said opening, said light enclosure having an outer structure with an interior surface which defines an enclosed inner space within which a core element is positioned, said interior surface of said outer structure and said core element defining an open space;

a container defining a first variable volume chamber for holding a first chemical light material and a second variable volume chamber for holding a second chemical light materials;

a mixing chamber coupled to said light enclosure and to said first and second chambers for mixing together said first and second chemical light materials to produce a third chemical material which radiates light, wherein said third chemical material is caused to flow into said open space of said light enclosure; and a control device for controlling the operation of said mixing chamber.

2. The system of claim 1 further comprising a displacement device coupled to said first and second chambers for changing the volume of said first and second chambers.

3. The system of claim 2 further comprising a drive device coupled to said displacement device for driving said displacement device to change the volume of said first and second chambers.

4. The system of claim 3 wherein said drive device is a container of compressed gas.

5. The system of claim 4 wherein said control device controls the operation of said displacement device in response to an activation signal.

* * * * *